June 17, 1924.
A. F. FINCH
TIRE MOUNTING
Original Filed July 1, 1922
1,498,369
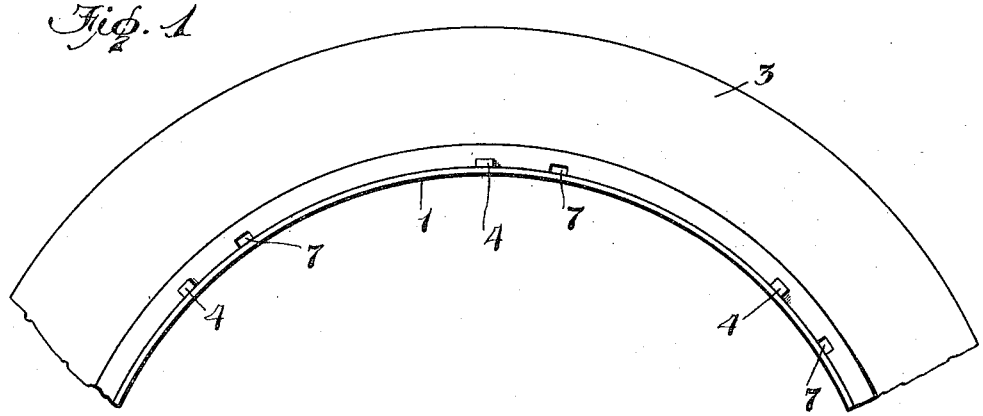
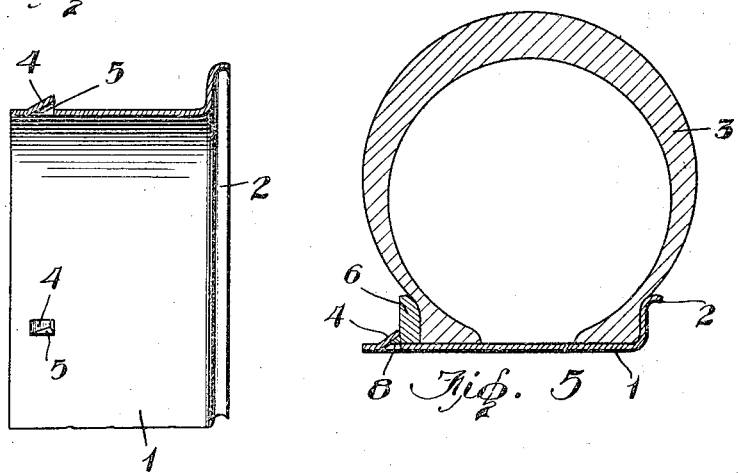
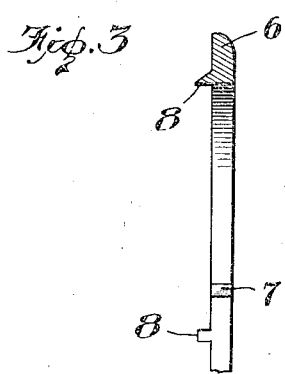
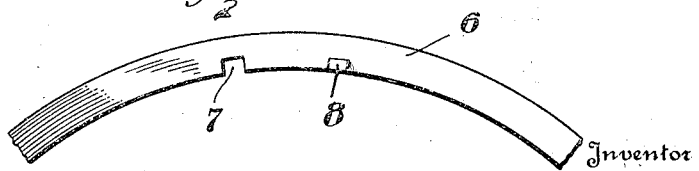
Inventor
Albert F. Finch
By Townshend & Townshend
Attorney Patented June 17, 1924.

1,498,369

UNITED STATES PATENT OFFICE.

ALBERT F. FINCH, OF TOULMINVILLE, ALABAMA.

TIRE MOUNTING.

Application filed July 1, 1922, Serial No. 572,168. Renewed May 5, 1924.

*To all whom it may concern:*

Be it known that I, ALBERT F. FINCH, a citizen of the United States, residing at Toulminville, county of Mobile, and State of Alabama, have invented certain new and useful Improvements in Tire Mountings, of which the following is a specification.

My invention relates to tire mounting means for vehicle wheels equipped with pneumatic tires, and has for its primary object the provision of an improved and novel means of securing pneumatic tires to wheel rims, in which the use of bolts and tools is dispensed with.

Another object is the provision of means for automatically locking the tire retaining means to the wheel rim as the tire is inflated.

A further object is the provision of a novel form of tire retaining means by which the tire is mounted directly on the wheel, thereby eliminating the use of demountable rims, and the like.

With these and such other objects in view, as will be apparent from the description, the invention resides in the novel combination, construction and arrangement of parts hereinafter described and claimed and illustrated in the accompanying drawings, of which—

Figure 1 is a side elevation of a portion of a wheel rim and tire equipped with my invention;

Figure 2, a vertical section through the rim;

Figure 3, a vertical section through the tire retaining member;

Figure 4, a side elevation of a portion of the tire retaining member; and

Figure 5, a vertical section through a rim and tire equipped in accordance with my invention.

In detail the invention comprises a rim 1, adapted to be engaged over the felly band of a wheel, as a permanent part thereof, or as an attachment. The rim is of the usual construction, having the inner, retaining flange 2 arranged to receive the tire 3 mounted on the rim. In place of the ordinary construction of the outer edge of the usual type of rim on which the tires are mounted, in this particular instance the outer flange of the rim 1 is extended laterally and provided at peripherally spaced intervals with upstruck portions 4 spaced slightly inwardly of the extreme edge of the rim, as best illustrated in Figures 2 and 5. The upstruck portion 4 provides recesses 5 in the surface of the rim for a purpose hereinafter described.

The tire retaining means comprises in its preferred form an annular member, a retaining ring 6 provided at spaced intervals with notches 7 on its inner face, which notches are arranged in spaced relation to agree with the spacing of the upstruck portions 4 of the rim 1, the retaining ring 6 being of a size sufficient to be slipped laterally over the rim 1 with the portions 4 passing through the notches 7 in the ring.

At spaced intervals on the outer face of the ring 6 are arranged projections 8 terminating in points adapted to be engaged in the recesses 5 formed by the upstruck portions 4. When the retaining ring 6 is applied to the rim, it may be moved thereover by reason of the registry of the notches with the upstruck portions 4, and after positioning the ring may be turned on the rim to bring the projection 8 in alignment with the upstruck portions 4 and as the tire 3 is inflated the retaining ring 6 will be forced outwardly wedging the projections 8 into the recesses 5 and automatically locking the retaining ring on the rim against lateral or circumferential displacement. When it is desired to remove the tire, it is merely necessary to deflate the same after which the retaining ring may be disengaged from its locked relation with the upstruck portions 4 on the rim and turned longitudinally to bring the notches 7 into alignment with the portions 4 after which it may be removed from the rim and the tire then taken therefrom.

It is obvious that with this construction the use of tools is entirely dispensed with; there are no bolts or any such arrangement of parts as require the use of any tools. The action in this construction is entirely automatic with respect to locking the tire and retaining ring to the wheel, as when the tire is inflated the lateral pressure exerted against the ring 6 serves to force it tightly against the upstruck portions 4, wedging the projections 8 in the recesses 5 as described.

In the present invention it is contemplated that the tire be mounted directly upon the rim 1, and whether the rim is a permanent part of the felly band of the vehicle wheel or whether it is used as a separate element does not enter into the invention, the improvement residing in the novel means of retaining the tire on the rim and the manner of mounting the same.

I claim:

In a tire mounting, a tire carrying rim provided at one side with an upright retaining flange and at the opposite side with a lateral cylindrical flange flush with the rim, said lateral flange being perforated at peripherally spaced intervals and upstruck at an incline to form retaining members, a tire retaining ring provided with spaced notches adapted to pass over said upstruck members whereby the ring may be disposed on the rim, said ring being adapted for circumferential movement of the rim when applied, and laterally projecting spurs carried by said ring and spaced from said notches for engagement in said lateral flange beneath said upstruck members in one position of the ring for locking said ring on the rim on the inflation of a tire.

I hereunto affixed my name to the foregoing specification.

ALBERT F. FINCH.